Aug. 14, 1951     G. C. VON BECK     2,564,086
LEVEL WINDING MEANS FOR FISHING REELS
Filed March 26, 1948
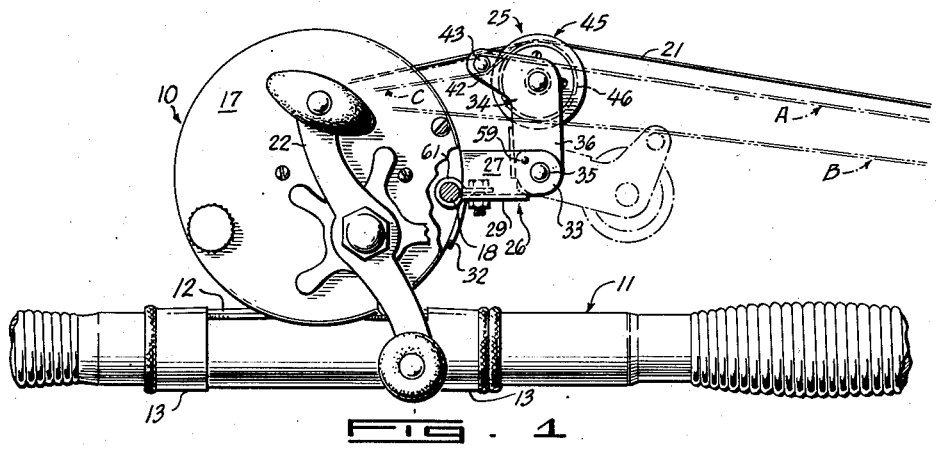
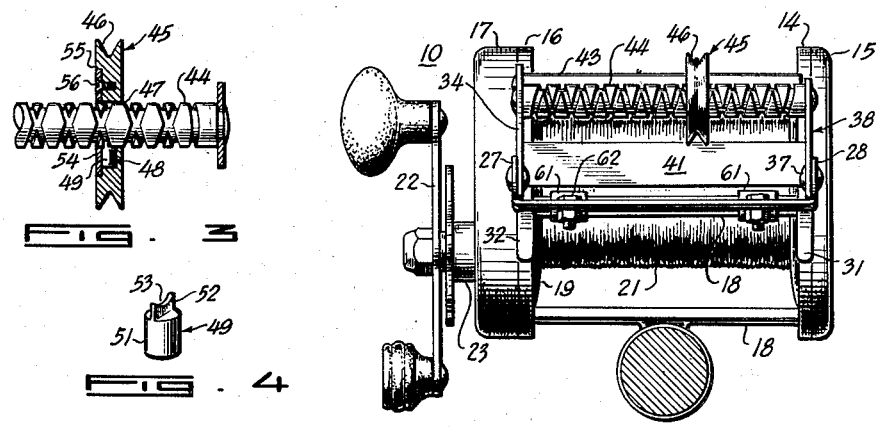
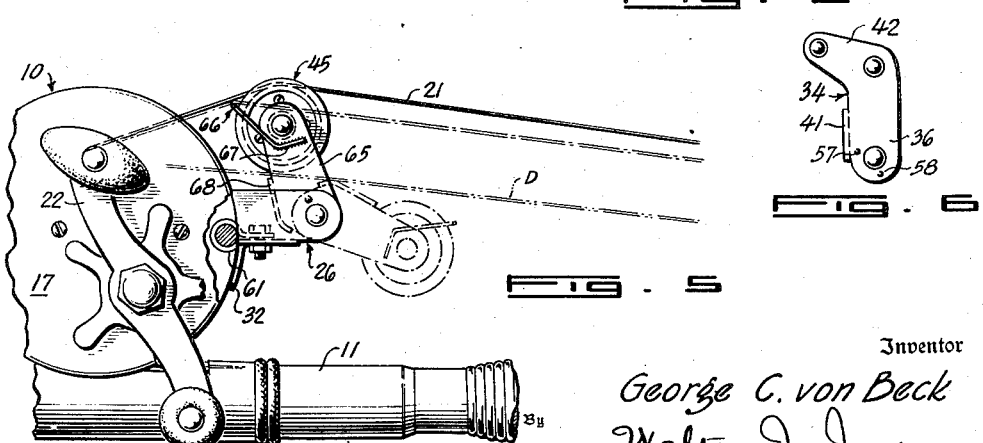
Inventor
George C. von Beck
Walter J. Jason
Attorney Patented Aug. 14, 1951

2,564,086

UNITED STATES PATENT OFFICE 2,564,086

LEVEL WINDING MEANS FOR FISHING REELS

George C. von Beck, San Diego, Calif.

Application March 26, 1948, Serial No. 17,259

3 Claims. (Cl. 242—84.4)

The present invention relates to fishing reels and more particularly to improvements in level winding casting fishing reels.

An object of the present invention is the provision of an improved form of level winding means readily attachable to conventional fishing reels.

Another object of the present invention is to provide a level winding means of improved design and construction which is readily movable to and from its winding position on a fishing reel.

Another object of the invention resides in providing an improved form of level winding means for a fishing reel which is adapted to be displaced from its operative winding position to permit free and unimpaired casting and which is associated with a spray deflecting means.

A still further object of this invention lies in the provision of an improved form of level winding means for a fishing reel, which is simple and economical of manufacture and which results in a more efficient and effective fishing reel.

Other objects and features of this invention will be readily apparent to those skilled in the art from the following specification and appended drawings illustrating certain preferred embodiments of the invention in which:

Figure 1 is a side elevational view of the level winding fishing reel embodying the improved level winding mechanism of the present invention;

Figure 2 is a front elevational view of the fishing reel of Figure 1;

Figure 3 is an enlarged fragmentary view of the level winding mechanism of the present invention partially in section;

Figure 4 is a perspective view of a detail;

Figure 5 is a view, in side elevation, of another embodiment of the invention; and Figure 6 is an elevational view of a detail.

Having particular reference now to the drawings, in connection with which like characters of reference will designate corresponding parts throughout, there is shown illustrated a fishing reel 10 mounted on a usual fishing rod 11. The fishing reel 10 is provided with a reel seat plate 12 which is secured in position on the fishing rod 11 by a pair of usual spaced ring-like clamp members 13 which fit over the ends of the reel seat plate to rigidly secure the fishing reel to the rod.

The fishing reel 10 comprises a frame formed of a tail plate 14 and its associated cap 15, a head plate 16, and a head cap or gear enclosing housing 17 with a plurality of pillars 18 connecting tail plate 14 to head plate 16 and maintaining them in spaced relation. A usual line carrying spool 19 is disposed between the head and tail plates 16 and 14 upon which the fishing line 21 is adapted to be wound. A crank 22 is mounted, for rotatable movement, exteriorly of head cap 17 upon a crank shaft 23 extending therethrough and is operatively connected to the line carrying spool through conventional gearing whereby it is adapted to actuate the spool to reel in the fishing line. The fishing reel 10 herein just described is understood to be of conventional design. The present invention is not to be limited to any particular construction of a fishing reel as all usual fishing reels whether of the deep sea, surf, or lake fishing type and embodying spaced end elements joined by pillars or connecting posts are contemplated for use, and the present invention renders them better devices for casting.

To the frame of the fishing reel 10 is secured the improved level wind mechanism of the present invention, shown generally at 25. The level wind mechanism 25 comprises a generally U-shaped mounting bracket 26 having upstanding arms 27 and 28 interconnected by a base portion 29. Integral with base portion 29 and depending therefrom at each end are arcuate-shaped pieces 31 and 32. Pieces 31 and 32 conform to the configuration of tail and head plates 14 and 16 and are adapted to be thereagainst, with piece 31 bearing upon tail plate 14 and piece 32 bearing against head plate 16 whereby they serve to act as braces to hold the level wind mechanism 25 firmly and rigidly upon the fishing reel 10. Arms 27 and 28 are each provided with an extended portion 33 which projects beyond base portion 29. Upon extended portion 33 of arm 27 is pivotally supported a generally L-shaped member 34, being pivotally mounted by a pivot pin 35 which passes through the lower end of leg 36 of member 34. To the extended portion 33 of arm 28 is pivotally affixed as by pivot pin 37 an elongate member 38. An elongate transverse brace member 41 interconnects L-shaped member 34 and elongate member 38. Rigidly secured to leg 42 of L-shaped member 34 is an elongated rod-like member 43 which extends from L-shaped member 34 and substantially spans the distance between spaced members 34 and 38. The purpose and function of rod-like member 43 will be described fully hereinafter.

Rigidly supported by and between L-shaped member 34 and elongate member 38 is a reversely threaded traversing shaft 44 which lies parallel to rod 43 carried by member 34. Slidably carried by the traversing shaft 44 is an annular or wheel element 45 which effects a line guide means. The wheel 45 has a peripheral groove 46 provided therein which is adapted to accommodate the fishing line 21 and has a bore 47 through which passes the shaft 44. The wheel 45 is provided with a recess 48 therein opening into bore 47 and into which is adapted to fit a pawl 49 which as best shown in Figure 4 comprises a cylindrical body portion 51 from one end of which projects a flat portion 52 the end of which is notched as at 53 whereby the pawl 49 may operatively engage the threads of traversing shaft 44. A circular cap or plate 54 is disposed in an annular recess 55 in wheel 45 so as to lie flush with the surface thereof and is secured thereto by studs 56 and serves to lock and retain pawl 49 in operative position within wheel 45.

The leg 36 of L-shaped member 34 is provided with a pair of projections or tits 57 and 58 which are adapted alternately to project or seat within a dimple 59 in portion 33 of arm 27 whereby the line guide assembly will be firmly maintained in its operative and inoperative positions as desired.

A pair of clamping means or arms 61 encircle the fishing reel interconnecting pillar 18 and their free ends are fastened to base 29 of mounting bracket 26 by studs 62 and thus serve to rigidly attach the whole level wind mechanism 25 to fishing reel 10. The particular clamping means disclosed is understood to be but one method of attachment and other forms of clamping means or devices are within the contemplation of the invention.

When it is desired to reel in the line 21 the level wind mechanism 25 occupies the position shown in full line representation in Figure 1. Herein the displaceable or pivotal carriage for wheel 45 effected by the cooperation of shaft 44 and shaft supporting members 34 and 38 occupies an upright or vertical position and the line 21 lies in the groove 46 provided in the periphery of wheel 45. The projection or tit 57 provided by leg 36 of L-shaped member 34 will seat in dimple 59 to firmly maintain the level wind mechanism 25 in this up position. As the fishing reel handle 22 is rotated to reel in the line 21 the motion of the line in groove 46 will effect a rotation of wheel 45 on traversing shaft 44 whereby by reason of the engagement of pawl 49 with shaft 44 the wheel 45 will be made to travel back and forth along shaft 44 to evenly and orderly wind line 21 upon the fishing reel. It is here noted that the shaft 44 does not rotate being rigidly affixed to its supports 34 and 38. It is only the wheel 45 which moves to effect a threading of the line 21 on the fishing reel, and the wheel 45 is made to rotate and move by the action of the line passing thereover and bearing thereupon. An efficient and effective level wind mechanism is thus provided.

In the winding or vertical position of level wind mechansm 25, as shown in full line representation in Figure 1, the rod 43, which is secured at one end to L-shaped member 34, lies to the rear of and between the line guide wheel 45 and the reel 10. Rod 43 will serve to protect the line 21 from damage if it should in some manner fall out of groove 46. In such case the line 21 will occupy the dotted line position marked A in Figure 1 and will rest upon the rod 43 and be held by it off the traversing shaft 44; if the line were permitted to be pulled or ride across shaft 44 it would foul or be shredded or torn by the threads thereof.

The rod 43 also serves as a spray deflector at such times as the line 21 rides therepast.

If desired the fishing line 21 could be inserted under the rod 43, being fitted thereunder at its free end, as shown in the dotted line representation at C; this will have the effect of more firmly retaining the line in the groove 46. However, if the line 21 should slip from the groove the use of the rod 43 as a guard is lost. To prepare the fishing reel 10 for casting the level wind mechanism 25 is moved to the extended position shown in dotted line representation in Figure 1. In moving from the reel in or wind position to the casting position the projection or tit 57 will be forced out of dimple 59 and the mechanism 25 will as it passes overcenter overbalance and flop or fall, under gravity, to its casting position wherein projection 58 seats in dimple 59 and locks mechanism 25 in place. It is noted that it is not necessary for a fisherman to maintain his finger or hand on the level wind mechanism 25 and push it for the full distance, for as has been stated the level wind mechanism 25 after the initial manual actuation to pass overcenter will fall of its own weight into casting position. In this position the line 21 will occupy the dotted line position in Figure 1 marked B and rides upon rod 43. When a catch has been made, it is a very simple matter for the fisherman to snap the level wind mechanism 25 into its upright position and lift the line into the groove 46 of wheel 45 and begin reeling in. The wheel 45 will rotate as the line 21 passes thereover and ride back and forth on traversing shaft 44 to dispose the line 21 properly upon the fishing reel 10.

It is evident that with the present invention a more efficient fishing device is effected. The displaceable level wind mechanism is not in the way when a cast is made and therefore there will be no interference with or marring of the cast. And when it is desired to reel in a catch the level wind mechanism is readily manually actuable to wind position and operates in efficient manner to effect proper placement of the line on the fishing reel. The present invention obviates the objection that many fishermen have to the use of a level wind device on a casting rod because of the greater difficulty of obtaining a free and easy cast. Such fishermen prefer to rely on their fingers to guide the line onto the fishing reel when reeling in and consequently the line is rarely if ever properly wound. With the displaceable level wind mechanism 25 herein disclosed a means is provided for securing proper winding of the line and which is moved out of the way when it is not being used and therefore it cannot be objected to as being a hindrance to good casting.

The present invention is adapted for ready attachment to any variety of fishing reel, it being understood that with different sizes of fishing reels the dimensions of certain of the elements comprising the level wind mechanism 25 will be in conformance to the size of the fishing reel being serviced. However the arrangement of elements and functioning thereof remains the same though the size be changed.

Another embodiment of the invention is disclosed in Figure 5. In this embodiment the level wind mechanism 25 utilizes a similar mounting bracket 26 secured to a pillar 18 by clamping means 61. However, in place of the pivotally mounted generally L-shaped member 34 there is substituted a pivotally mounted elongate member 65 to which one end of the traversing shaft 44 is rigidly secured, the other end being secured to a similar member at the opposite end of mounting bracket 26. A wheel 45 is movably mounted on traversing shaft 44 and operates in similar manner and for the same purpose as in the preferred embodiment. To maintain the fishing line 21 off traversing shaft 44 if it should slip from wheel 45 is a member 66 formed of wire or similar small-diameter material and having an end 67 secured to elongate member 65 as by welding; the opposite end of wire 66 is secured in similar manner to the opposite pivoted supporting member 38. The wire 66, similarly to rod 43, extends parallel to traversing shaft 44 and between it and the fishing reel 10, when the level wind mechanism 25 is in wind position, and serves also as a spray deflector when the fishing line 21 rides therepast. In the casting position of the level wind mechanism 25, shown in dotted line representation in Figure 5, the wire 66 is moved free of line 21, which now is adapted to ride upon an elongated member 68, secured to the pivoted members which carry the shaft 44 and the wheel 45. The line 21, as indicated by the dotted line representation marked D, rides upon this member 68, the end of which isr radiused as shown so that the line 21 does not travel over a sharp edge. The present embodiment operates in the same manner as the device of Figures 1 and 2. It is readily displaceable and easily moved between wind position and casting position and provides no interference with the cast, and effects the proper disposal of the line upon the fishing reel 10 in the reeling in operation.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a fishing reel having a reel-frame and a rotatably mounted spool therein, a level wind means for a fishing line comprising a supporting bracket carried by said reel-frame, a reversely threaded traversing shaft, a pivoted carriage non-rotatably supporting said traversing shaft and movable toward and away from a line-guiding position, said carriage comprising a generally L-shaped member pivoted at one end to said supporting bracket, an elongate rod supported at the opposite end of said L-shaped member parallel with said traversing shaft, said traversing shaft being mounted on said L-shaped member between its pivotally connected end and said rod, and a wheel mounted on said traversing shaft for reciprocable movement thereon, said wheel having a peripheral groove in which a fishing line is adapted to be carried to frictionally move said wheel whereby the latter may guide the fishing line as it is being wound onto the spool, said rod being arranged to lie between said reel-frame and said traversing shaft when said carriage is in line guiding position whereby said rod is engageable by the fishing line, should it inadvertently slip from said wheel, to prevent injury thereto.

2. In a fishing reel having a reel-frame supporting a rotatably mounted spool, a level wind means for a fishing line comprising a rotatably mounted wheel having a peripheral groove in which a fishing line is adapted to be carried to frictionally move said wheel whereby the latter may guide the fishing line as it is being wound onto the spool, a mounting bracket carried by said reel-frame, a manually actuable carriage pivotally supported by said bracket for mounting said wheel and adapted to move it into and out of line guiding position, said carriage comprising a generally L-shaped member and an elongate member spaced therefrom and each of which is pivotally connected at one of their ends to said mounting bracket, a reversely threaded traversing shaft carried by said spaced members and held against rotative movement, said traversing shaft mounting said wheel for reciprocal movement thereon, an elongate rod carried by said generally L-shaped member at its free end parallel with said traversing shaft and arranged to lie between said reel-frame and said traversing shaft when said carriage is manually operated to dispose said wheel in line-guiding position whereby said rod is engageable by the fishing line, should it inadvertently slip from said wheel, to prevent injury thereto.

3. In a fishing reel having a reel-frame supporting a rotatably mounted spool, a level wind means for a fishing line comprising a rotatably mounted wheel having a peripheral groove in which a fishing line is adapted to be carried to frictionally move said wheel whereby the latter may guide the fishing line as it is being wound onto the spool, a mounting bracket carried by said reel-frame, a manually actuable carriage pivotally supported by said bracket for mounting said wheel and adapted to move it into and out of line guiding position, said carriage comprising a generally L-shaped member and an elongate member spaced therefrom and each of which is pivotally connected at one of their ends to said mounting bracket, a reversely threaded traversing shaft carried by said spaced members and held against rotative movement and on which shaft said wheel is carried, said wheel having a recess therein opening to the exterior through the side thereof, a pawl carried in said recess, a cover for closing said recess to maintain said pawl therein, said pawl having a portion thereof adapted to engage said traversing shaft for reciprocal movement of the wheel on said shaft as the fishing line moves over the wheel, an elongate rod carried by said generally L-shaped member at its free end parallel with said traversing shaft and arranged to lie between said reel-frame and said traversing shaft when said carriage is manually operated to dispose said wheel in line-guiding position whereby said rod is engageable by the fishing line, should it inadvertently slip from said wheel, to prevent injury thereto, spaced projections on said L-shaped member arranged for cooperation with a dimple in said supporting bracket to maintain said carriage in its operative positions when manually moved thereto.

GEORGE C. von BECK.

REFERENCES CITED

The following references are of record in the file of this patent:

UNITED STATES PATENTS

| Number | Name | Date |
|---|---|---|
| 905,329 | Krause et al. | Dec. 1, 1908 |
| 1,151,349 | Flegel | Aug. 24, 1915 |
| 1,614,104 | Comstock | Jan. 11, 1927 |
| 2,305,045 | Torrence | Dec. 15, 1942 |
| 2,445,212 | Eaby | July 13, 1948 |